(No Model.) 2 Sheets—Sheet 1.

J. A. DUTTERA & J. F. FLICKINGER.
SULKY ATTACHMENT FOR PLOWS.

No. 546,919. Patented Sept. 24, 1895.

WITNESSES:
M. P. Blondel
Edw. W. Byrn

INVENTORS
John A. Duttera.
Joshua F. Flickinger.
BY Munn & Co.
ATTORNEYS.

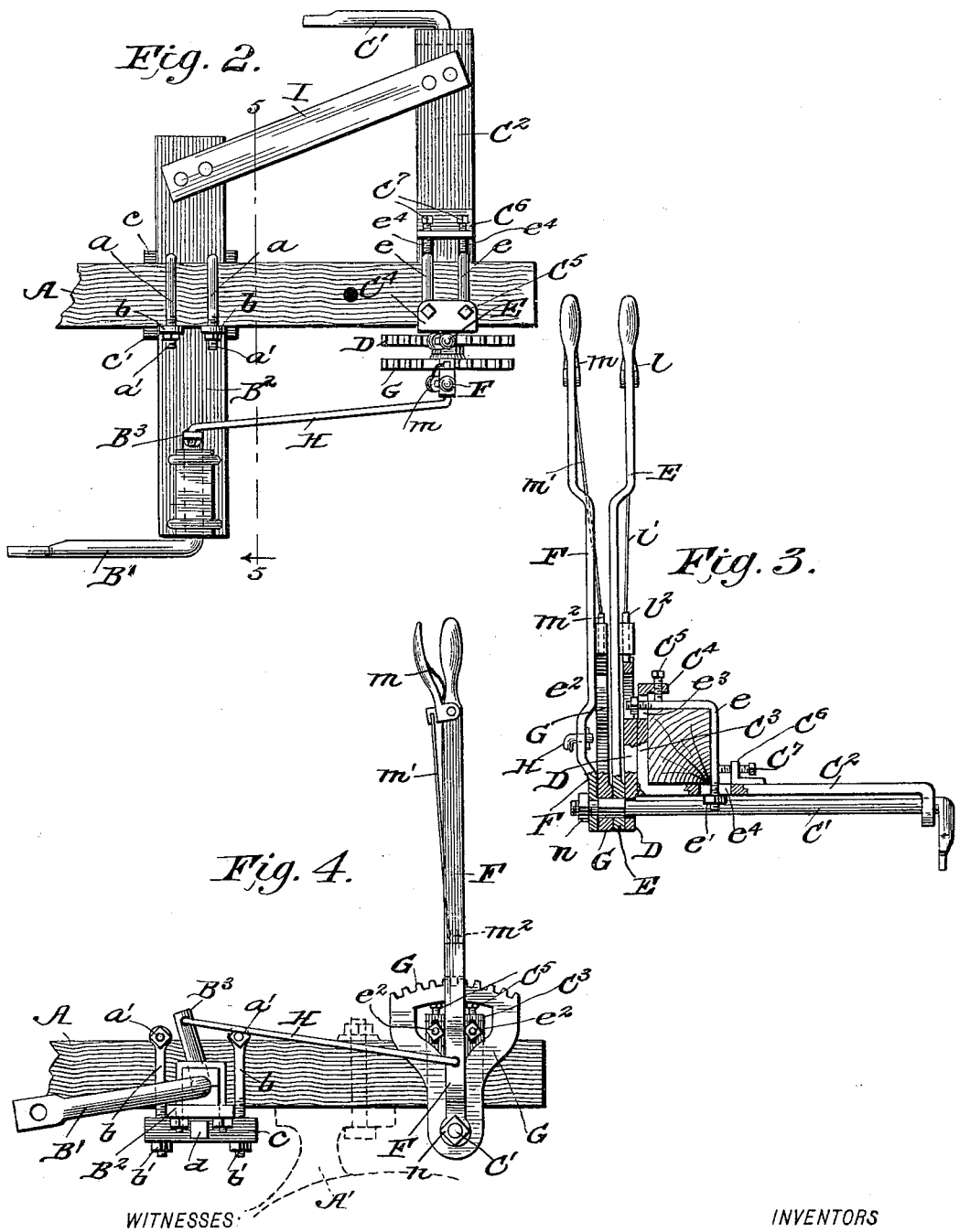

UNITED STATES PATENT OFFICE.

JOHN A. DUTTERA AND JOSHUA F. FLICKINGER, OF HANOVER, PENNSYLVANIA.

SULKY ATTACHMENT FOR PLOWS.

SPECIFICATION forming part of Letters Patent No. 546,919, dated September 24, 1895.

Application filed April 29, 1895. Serial No. 547,530. (No model.)

*To all whom it may concern:*

Be it known that we, JOHN A. DUTTERA and JOSHUA F. FLICKINGER, of Hanover, in the county of York and State of Pennsylvania, have invented a new and useful Improvement in Sulky Attachments for Plows, of which the following is a specification.

Our invention is designed to provide a sulky attachment for plows which may be sold to the farmer and applied by him to any form of plow having a beam without weakening the plow-beam by the boring of holes through it, and which may, if desired, be removed from the beam at any time to permit the plow to be used separately and alone.

Our invention comprises means for adjustably fastening the sulky attachment to plow-beams of different size and shape without cutting or boring into the same, and in means for simultaneously adjusting both the running-wheels of the sulky to raise or lower the plow to make it run deep or shallow, or lift it entirely out of the ground, and in means for adjusting only one of the wheels to adapt the sulky to use on a hillside, all as hereinafter more fully described with reference to the drawings, in which—

Figure 1:
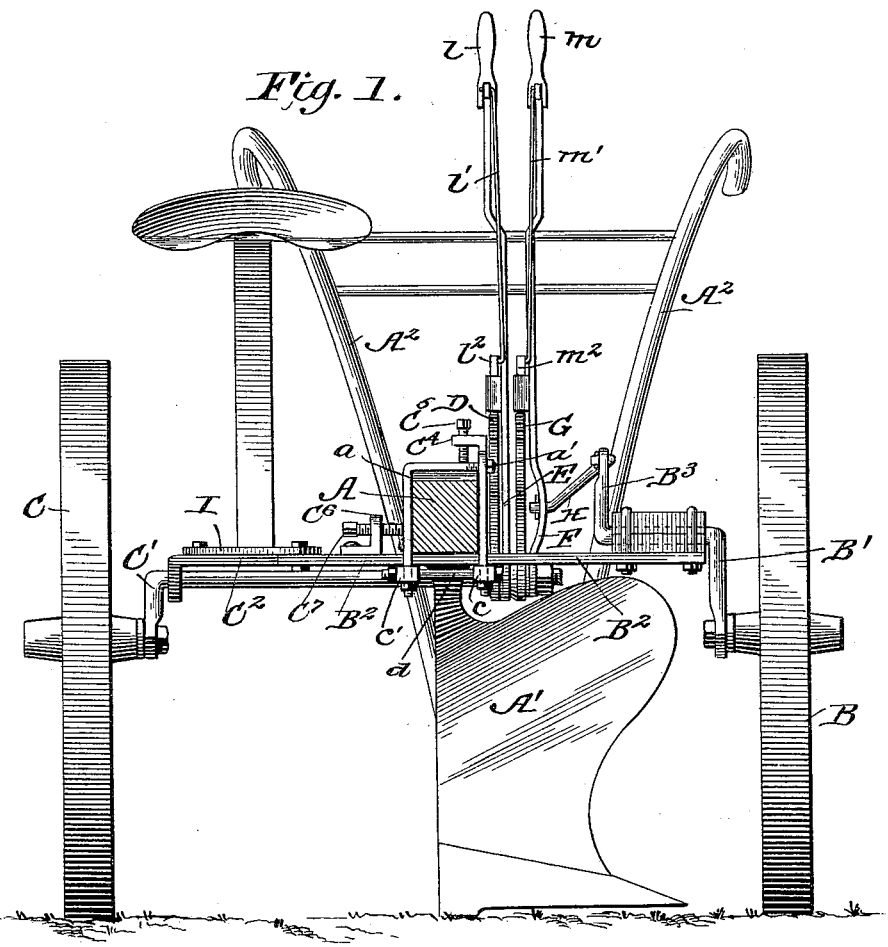
Figure 5:
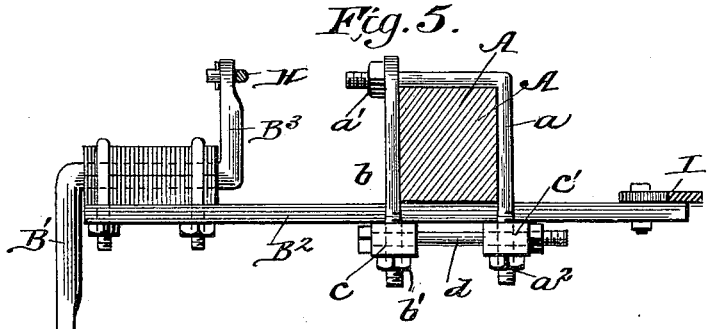

Figure 1 is a front elevation of the sulky attachment applied to a plow. Fig. 2 is a partial plan view showing the connection of the two crank-axles to the plow-beam. Fig. 3 is a rear end view of the plow-beam and rear crank-axle, partly in section. Fig. 4 is a partial side view; and Fig. 5 is a cross-section through the beam at the connections of the front crank-axle, on line 5 5 of Fig. 2, looking in the direction of the arrow.

In the drawings, A represents the plow-beam, A' a mold-board plow, and $A^2 A^2$ its handles. Our invention is shown applied to this form of plow, and it comprises a running-wheel B, crank-axle B', and supporting-frame $B^2$, detachably applied to the beam in front of the mold-board standard, and a running-wheel C, crank-axle C', and supporting-frame $C^2$, detachably applied to the beam in rear of the mold-board. The supporting-frames $B^2$ and $C^2$ of both these crank-axles are provided with special means for connecting them to the beam without cutting, boring, or mutilating the latter, and adapted to fit different sizes or shapes of beam. The front frame $B^2$ has two angle-bars $a\ a$, Fig. 5, bent at right angles and provided with screw-threaded ends and nuts $a'\ a^2$. Vertical bars $b\ b$ have holes in their upper ends, through which the upper ends of bars $a$ protrude and are adjustably secured by the nuts $a'$, and at their lower ends have screw-threaded ends that pass through a clamp-plate $c$, Figs. 4 and 5, and are adjustably secured thereto by nuts $b'$. The lower ends of the angle-bars $a$ pass through holes in another clamp-plate $c'$, and are secured thereto adjustably by nuts $a^2$. The two clamp-plates $c$ and $c'$ are adjustably fastened together by a bolt $d$. Now, when the end portion of the frame $B^2$ of the front crank-axle is caught between the clamp-plates $c\ c'$ and the bottom of the beam it will be securely held thereto by simply screwing up the nuts. The nuts $a'\ a'$ and bolt $d$ give a variable adjustment to different widths of beam, while the nuts $b'$ and $a^2$ adjust the clamp to the vertical thickness of the beam, so that the front crank-axle may be securely clamped to beams of varying size and without boring or cutting into the same.

The crank-axle frame $C^2$ of the rear running-wheel is (see Fig. 3) simply bent down and perforated at its outer end to give passage to and form a bearing for the crank-axle $C'$, and its inner end is turned up at $C^3$ and made to hug the rear end of the beam on two sides. The other two sides of the beam are inclosed by right-angle bars $e\ e$. These angle-bars have screw-threaded ends with nuts $e'\ e^2$, and the upper ends pass through elongated vertical slots $e^3$ in the frame-plate $C^3$ and their lower ends pass through elongated horizontal slots $e^4$ in the horizontal portion $C^2$ of the frame-plate. At the upper end of the part $C^3$ of the frame-plate is an overhanging flange $C^4$, through which vertical set-screws $C^5$ are tapped and made to bear against the ends of the angle-bars $e$. A similar flange $C^6$ rises from the portion $C^2$ of the frame-plate and has horizontal set-screws $C^7$ tapped through it and bearing against the lower ends of the angle-bars $e$. These set-screws, in connection with the elongated slots, form means for adjusting the clamping devices to plow-beams of different size. Thus for a plow-beam of less vertical thickness the set-screws C⁵ would be turned down to force the upper ends of angle-bars $e$ down on the slots $e^3$. To accommodate a beam of less thickness, the set-screws C⁷ are set up and made to force the lower ends of the angle-bars $e$ laterally in the slots $e^4$, the nuts on the ends of the angle-bars $e$ being screwed up to accommodate this new adjustment.

We will now describe the means for adjusting together or singly the crank-axles of the two running-wheels.

D is a vertical plate rigidly bolted or otherwise secured to the side of the plate C³ of the rear axle-frame. The upper part of the plate D is formed into a toothed segment, while the lower part is perforated to form a bearing for the rear crank-axle C', which is extended beyond this bearing far enough to receive two hand-levers E F. Of these levers, E is rigidly fixed to the crank-axle by a square perforation and squared portion of the axle, so that this lever rocks the axle. To hold this lever to its adjustment it is provided with the usual spring-latch $l$, with rod $l'$ and spring-bolt $l^2$ engaging with the toothed segment of the rigid plate D. Just beside the lever E is arranged a second segment-plate G, which is connected to the crank-axle by a square hole fitting over a squared portion of the axle, so as to be rigid on but movable with the axle. Beside this segment-plate is the other lever F, which is loosely hung upon a rounded portion of the crank-axle, near its end, being retained thereon by a nut $n$. This lever is also provided with a spring-latch $m$, rod $m'$, and spring-bolt $m^2$, engaging with the teeth at the top of the segment-plate.

H is a connecting-rod, Figs. 2 and 4, connecting the lever F with the upturned end B³ of the front crank-axle B', and I is a brace extending between the front and rear crank-axle frame.

The operation of this sulky attachment in adjusting the wheels is as follows: If it is desired to adjust both crank-axles and running-wheels at the same time, the lever E is grasped and turned to raise or lower the plow, as the case may be, and as this lever is rigid on the rear crank-axle it rocks the rear crank-axle and adjusts its wheel, and at the same time it rocks the front crank-axle and adjusts its wheel, because lever E in turning rear crank-axle also turns the segment-plate G, having a squared connection with the axle, and segment-plate G turns lever F, to which it is locked by its spring-bolt, and lever F is connected through rod H to the front crank-axle. If it is desired to adjust the front crank-axle alone, to accommodate plowing on the incline of a hillside, only the lever F is turned. This being connected to the front crank-axle by rod H but loose on the rear crank-axle, only turns the front one and is locked on its segment-plate G to its adjustment, which segment-plate is held stationary by its square connection with the crank-axle, the lever E, and the rigid segment-plate D.

This sulky attachment can be applied to either right or left hand plows, and any form of plow having a beam, without cutting, boring, or mutilating said beam.

Having thus described our invention, what we claim as new, and desire to secure by Letters Patent, is—

1. A sulky attachment for plows comprising separate crank axles with running wheels, frame plates arranged transversely to the plow beam and provided with axial bearings for the crank axles, two adjustable clamping devices arranged respectively one upon each transverse frame plate to clamp the attachment to plow beams of variable size, levers for operating the crank axles, and a connecting rod extending between and connecting the crank axles for simultaneous movement substantially as shown and described.

2. A sulky attachment for plows comprising separate crank axles with running wheels, frame plates arranged transversely to the plow beam and provided with axial bearings for the crank axles, two adjustable clamping devices arranged respectively one upon each transverse frame plate to clamp the attachment to plow beams of variable size, two hand levers arranged upon the rear crank axle, one rigidly thereon, and the other loose, the loose lever having upon one side a toothed locking segment rigidly fixed to the frame work, and carrying upon the other side a toothed locking segment for the hand lever which is rigid upon the crank axle, and a connecting rod connecting this rigid hand lever to the front crank axle at points eccentric to their axes substantially as and for the purpose described.

3. The combination with the front crank-axle, and its frame plate; of a clamp for securing it to the plow beams comprising two right angular bars with screw threaded ends, two vertical bars with perforated upper ends, two clamp plates perforated to receive the lower ends of both these pairs of bars, and a horizontal bolt for adjustably connecting said two clamp plates substantially as shown and described.

4. The rear crank-axle frame plate having a vertical extension with vertical slots and an overhanging flange with vertical set screws, and having also horizontal slots in the horizontal portion with flange and horizontal set screws; in combination with right angular bars inclosing the plow beam in the angle of the frame plate and extending through the slots and secured adjustably by nuts substantially as and for the purpose described.

JOHN. A. DUTTERA.
JOSHUA F. FLICKINGER.

Witnesses:
C. M. WINEBRENNER,
HENRY BANGE.